United States Patent
Kim et al.

(10) Patent No.: US 10,025,849 B2
(45) Date of Patent: Jul. 17, 2018

(54) QUESTION ANSWERING SYSTEM AND METHOD

(71) Applicant: Electronics and Telecommunications Research Institute, Daejeon (KR)

(72) Inventors: Young Rae Kim, Daejeon (KR); Hyung Jik Lee, Daejeon (KR); Jin Young Moon, Daejeon (KR); Chang Seok Bae, Daejeon (KR); Hyun Ki Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 701 days.

(21) Appl. No.: 14/602,904

(22) Filed: Jan. 22, 2015

(65) Prior Publication Data

US 2015/0324456 A1    Nov. 12, 2015

(30) Foreign Application Priority Data

May 8, 2014 (KR) .................. 10-2014-0054769

(51) Int. Cl.
*G06F 17/30* (2006.01)
*G06N 5/00* (2006.01)

(52) U.S. Cl.
CPC .. *G06F 17/30657* (2013.01); *G06F 17/30011* (2013.01); *G06F 17/30654* (2013.01); *G06F 17/30696* (2013.01); *G06N 5/00* (2013.01)

(58) Field of Classification Search
CPC ......... G06F 17/30654; G06F 17/30696; G06F 17/30011; G06F 17/30657; G06F 17/2775; G06F 17/2785; G06F 17/21; G06Q 30/0631
See application file for complete search history.

(56) References Cited

U.S. PATENT DOCUMENTS

| 6,594,658 B2 | 7/2003 | Woods |
| 6,947,923 B2 | 9/2005 | Cha et al. |
| 2001/0000356 A1* | 4/2001 | Woods .............. G06F 17/30011 |

(Continued)

FOREIGN PATENT DOCUMENTS

KR    2010-0049271 A    5/2010

*Primary Examiner* — Scott A. Waldron
*Assistant Examiner* — Fatima P Mina
(74) *Attorney, Agent, or Firm* — Nelson Mullins Riley & Scarborough LLP; Anthony A. Laurentano

(57) ABSTRACT

Provided is a question answering system with respect to a natural language question and a method thereof. The question answering system includes a candidate answer generating unit configured to extract a document mapped to an input natural language question, and generate candidate answers with respect to the natural language question from the extracted document, a text entailment recognizing unit configured to generate a text entailment recognition result representing a degree of association between multiple evidence sentences including the generated candidate answers and the natural language question, a list generating unit configured to generate a candidate answer list including the multiple evidence sentences in high association degree order on the basis of the text entailment recognition result, and an output unit configured to output the generated candidate answer list as a search result with respect to the natural language question.

9 Claims, 12 Drawing Sheets

(56) References Cited

U.S. PATENT DOCUMENTS

| | | | |
|---|---|---|---|
| 2002/0107844 A1* | 8/2002 | Cha | G06F 17/30684 |
| 2006/0242553 A1* | 10/2006 | Kulas | G06F 17/30864 |
| | | | 715/206 |
| 2009/0157401 A1* | 6/2009 | Bennett | G06F 17/27 |
| | | | 704/243 |
| 2011/0270604 A1* | 11/2011 | Qi | G06F 17/271 |
| | | | 704/9 |

* cited by examiner

QUESTION ANSWERING SYSTEM AND METHOD

CROSS-REFERENCE TO RELATED APPLICATIONS

This application claims priority to and the benefit of under 35 U.S.C. § 119 Korean Patent Application No. 10-2014-0054769, filed on May 8, 2014, the disclosure of which is incorporated herein by reference in its entirety.

TECHNICAL FIELD

The present invention relates to a question answering system and method, and more particularly, to a question answering system and method for providing an answer to a natural language question.

BACKGROUND

A related art question answering system displays a list of documents including answers to questions (queries) on the basis of a keyword of questions input by a user. The related art question answering system ranks documents through various ranking algorithms such as the frequency, an n-gram, document reliability, and page rank, and the like, and lists the ranked documents to show them to a user. Thus, the user should find an answer with respect to his or her question among the listed documents.

Here, among the various ranking algorithms, the n-gram is a method of generating an index term in units of syllables and matching the generated index term to a search word. For example, in the n-gram, whether listed order of input keywords and listed order of keywords included in a searched document are identical is determined. Largely, the n-gram is used to search for a document having accurate keywords.

Longest matching technique, similar to the n-gram, is a technique of adding reliability to a document which has the largest sameness with respect to a keyword. Longest matching is used to search with a long keyword or search for a document including the same sentence.

Page rank is a technique of denoting document reliability in ranking a document. For example, page rank is a calculation method of increasing reliability by the number of other hyperlinked sites.

The related art question answering system also includes a term frequency-inverse document frequency (TF-IDF) technique using the product of word frequency of keywords and inverse document frequency, as a weighting factor. Thus, TF-IDF obtains a weighting factor of a particular word of a document. Thereafter, TF-IDF provides a document including words having a weighting factor equal to or greater than a preset weighting factor, as search results, to a user. Accordingly, the user may perform keyword-based searching in the document.

The related art question answering systems as mentioned above show an excessive amount of information by using keyword-based search method. Thus, users should effort to understand an excessive amount of information searched on the basis of a keyword to search for his or her desired answer, and thus, fatigue increases accordingly.

In addition, in the related art question answering systems adopt a method of extracting a keyword and perform searching although inputting is performed in a natural language, so the meaning of a natural language is not reflected.

SUMMARY

Accordingly, the present invention provides a question answering system and method for providing an answer-based output to a user by generating a candidate answer list by combining evidence sentences according to a text entailment recognition result performed on a natural language question and candidate answers.

In one general aspect, a question answering system includes: an input unit configured to receive a natural language question in at least one of a sound form and a text form; a candidate answer generating unit configured to extract a document mapped to the input natural language question, and generate candidate answers with respect to the natural language question from the extracted document; a text entailment recognizing unit configured to generate a text entailment recognition result representing a degree of association between multiple evidence sentences including the generated candidate answers and the natural language question; a list generating unit configured to generate a candidate answer list including the multiple evidence sentences in high association degree order according to the text entailment recognition result; and an output unit configured to output the generated candidate answer list as a search result with respect to the natural language question.

The text entailment recognizing unit may include: a word entailment recognizing unit configured to recognize word entailment between the multiple evidence sentences and the natural language question by using at least one of a distance between lexical networks and word similarity; a sentence entailment recognizing unit configured to recognize sentence entailment between the multiple evidence sentences and the natural language question on the basis of similarity of a syntax structure and pattern similarity; and a context entailment recognizing unit configured to recognize context entailment between the multiple evidence sentences and the natural language question by using a case frame.

The list generating unit may include: a basic form list generating unit configured to generate a word type basic form candidate answer list by combining the candidate answers and the multiple evidence sentences on the basis of similarity of words; a definition form list generating unit configured to generate a sentence type definition form candidate answer list by combining the candidate answers and the multiple evidence sentences on the basis of at least any one of the similarity of a syntax structure, the pattern similarity, and the case frame; and a parade form list generating unit configured to generate a word parade type parade form candidate answer list by combining the candidate answers and the multiple evidence sentences.

The definition form list generating unit may statistically and semantically extract common order of the text lists through entailment recognition of text lists and combine the extracted text lists.

The output unit may output an evidence sentence corresponding to a candidate answer selected by a user from the candidate answer list.

The number of candidate answer list may be determined according to a size of a display screen.

In another general aspect, a question answering method includes: generating candidate answers with respect to a natural language question; generating a text entailment recognition result representing a degree of association between multiple evidence sentences including the generated candidate answers and the natural language question; generating a candidate answer list including the multiple evidence sentences in high association degree order according to the text entailment recognition result; and outputting the generated candidate answer list as a search result with respect to the natural language question.

The generating of candidate answers with respect to the natural language question may include: receiving the natural language question; performing entailment recognition on the input natural language question; extending a meaning of the natural language question through the entailment recognition result; extracting a document mapped to the extended natural language question; and generating candidate answers with respect to the natural language question from the extracted document.

The generating of an entailment recognition result may include: recognizing word entailment between the multiple evidence sentences and the natural language question by using at least one of a distance between lexical networks and word similarity; recognizing sentence entailment between the multiple evidence sentences and the natural language question on the basis of at least one of similarity of a syntax structure and pattern similarity; and recognizing context entailment between the multiple evidence sentences and the natural language question on the basis of a case frame.

The generating of a candidate answer list may include: generating a word type basic form candidate answer list by combining the candidate answers and the multiple evidence sentences on the basis of similarity of words; generating a sentence type definition form candidate answer list by combining the candidate answers and the multiple evidence sentences on the basis of at least any one of the similarity of a syntax structure, the pattern similarity, and the case frame; and generating a word parade type parade form candidate answer list by combining the candidate answers and the multiple evidence sentences.

The generating of a definition form candidate answer list may include: when a definition form candidate answer list in which the generated candidate answers are in a text list form is generated, statistically extracting common order of the text lists through entailment recognition of the text lists and displaying the extracted text list.

The outputting of a generated candidate answer list as a search result with respect to the natural language question may include: when a certain answer is selected from the candidate answer list, outputting an evidence sentence corresponding to the selected certain answer.

The outputting of a generated candidate answer list as a search result with respect to the natural language question may include: selecting one of the generated candidate answer list.

The generating of candidate answers with respect to the natural language question may include: adjusting the number of candidate answer list according to a size of a display screen.

Other features and aspects will be apparent from the following detailed description, the drawings, and the claims.

DETAILED DESCRIPTION OF EMBODIMENTS

Figure 1:
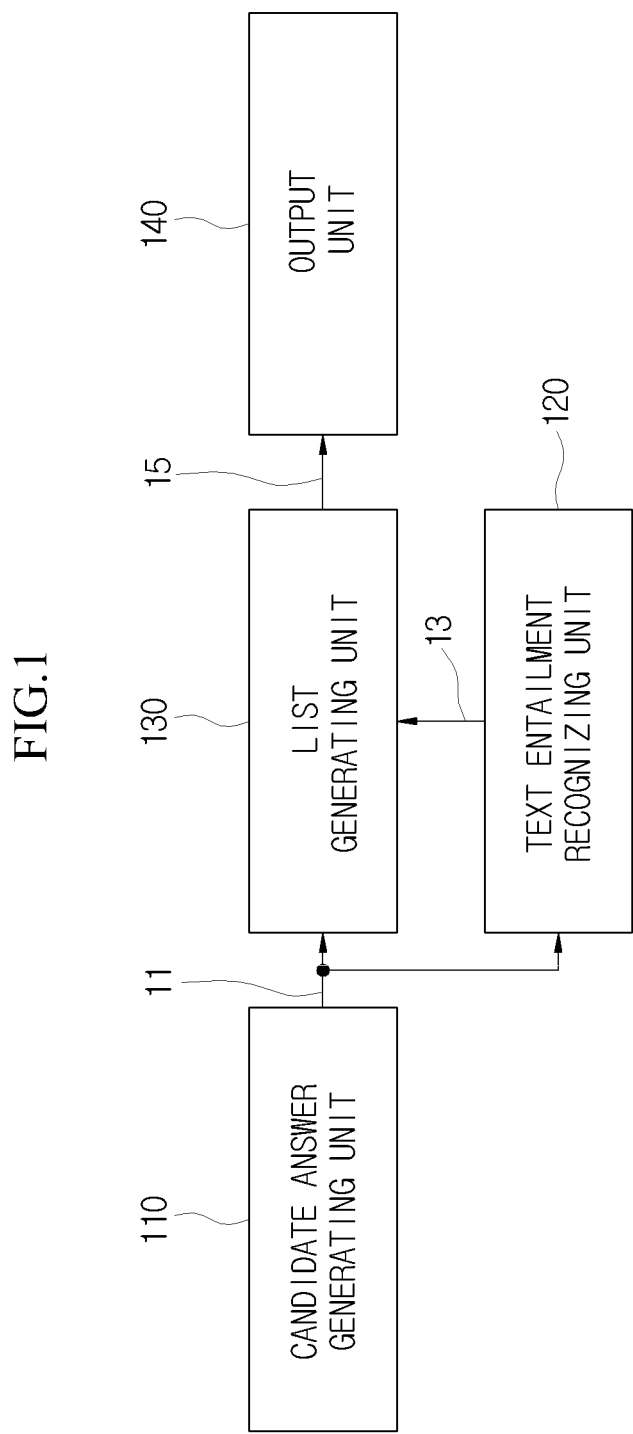
FIG. 1 is a block diagram illustrating a question answering system according to an embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Text Entailment Recognition

Text entailment recognition is a technique of recognizing a logical relationship between two texts on the basis of measurement of semantic association therebetween. For example, in a case in which there is directionality between text T (Text) and hypothesis text H (Hypothesis), a logical relationship between the two texts is recognized through text entailment recognition. That is, text entailment recognition is determining whether text H can be inferred on the basis of text T.

Natural Language

Natural language is a concept distinguished from a constructed language (or an artificial language). The constructed language is a language artificially created to express words used routinely by people. For example, a natural language question input to a search engine according to an embodiment of the present invention refers to a question in a format used routinely such as "Please recommend a method for making Kimchi Jjigae".

A question answering system according to an embodiment of the present invention combines a candidate answer with respect to a natural language question and an evidence sentence including the candidate answer through text entailment recognition and provides a candidate answer list with respect to the natural language question to a user. Here, combining may refer to a process of making a list by adding a candidate answer and an evidence sentence according to the result of text entailment recognition. Thus, in an embodiment of the present invention, the user may select an answer with respect to a question from a searched candidate answer list, rather than searching for an answer to a question from searched documents as in the related art, thus being conveniently provided with an answer with respect to the natural language question.

The question answering system and the method thereof according to an embodiment of the present invention may be realized in a computer or a computing resource identical thereto. Here, the computing resource may include a portable phone, a smartphone, a notebook computer (or a laptop computer), a digital broadcasting terminal, a personal digital assistant (PDA), a portable multimedia player (PMP), a navigation device, a stationary terminal such as a digital TV, a desktop computer, a wristwatch-type device, a glass-type device or only a device supporting a voice, and the like.

Hereinafter, an embodiment of the present invention will be described in detail with reference to the accompanying drawings.

FIG. 1 is a block diagram illustrating a question answering system according to an embodiment of the present invention.

Referring to FIG. 1, a question answering system for providing a candidate answer list includes a candidate answer generating unit 110, a text entailment recognizing unit 120, a list generating unit 130, and an output unit 140.

The candidate answer generating unit 110 extracts a document mapped to an input natural language question and generates candidate answers with respect to the natural language question in the extracted document. Thereafter, the candidate answer generating unit 110 delivers candidate answer information 11 regarding the generated candidate answers to the list generating unit 130. In addition, the candidate answer generating unit 110 delivers the candidate answer information 11 to the text entailment recognizing unit 120.

The text entailment recognizing unit 120 receives the candidate answer information 11 and recognizes text entailment between multiple evidence sentences including each of the candidate answers and the natural language question. The text entailment recognizing unit 120 may obtain a degree of association (or relevance) between the multiple evidence sentences and the natural language question through the result of text entailment recognition. Thereafter, the text entailment recognizing unit 120 delivers association degree information 13 between the multiple evidence sentences and the natural language question to the list generating unit 130.

The list generating unit 130 receives the candidate answer information 11 and the association degree information 13 from the candidate answer generating unit 110 and the text entailment recognizing unit 120, respectively. Here, the candidate answer information 11 includes evidence sentence information including candidate answers. The list generating unit 130 generates a candidate answer list 15 including multiple evidence sentences in high association degree order (namely, staring from the highest degree of association) by using the candidate answer information 11 and the association degree information 13. Thereafter, the list generating unit 130 delivers the generated candidate answer list 15 to the output unit 140.

The output unit 140 outputs the candidate answer list 15 received from the list generating unit 130, as search result with respect to the natural language question. Here, the number of candidate answer list 15 may be determined depending on a size of a screen in which the candidate answer list is displayed.

In this manner, according to an embodiment of the present invention, the user may select required answer information from among candidate answers included in the candidate answer list, rather than searching an answer with respect to a natural language question from documents.

Figure 2:
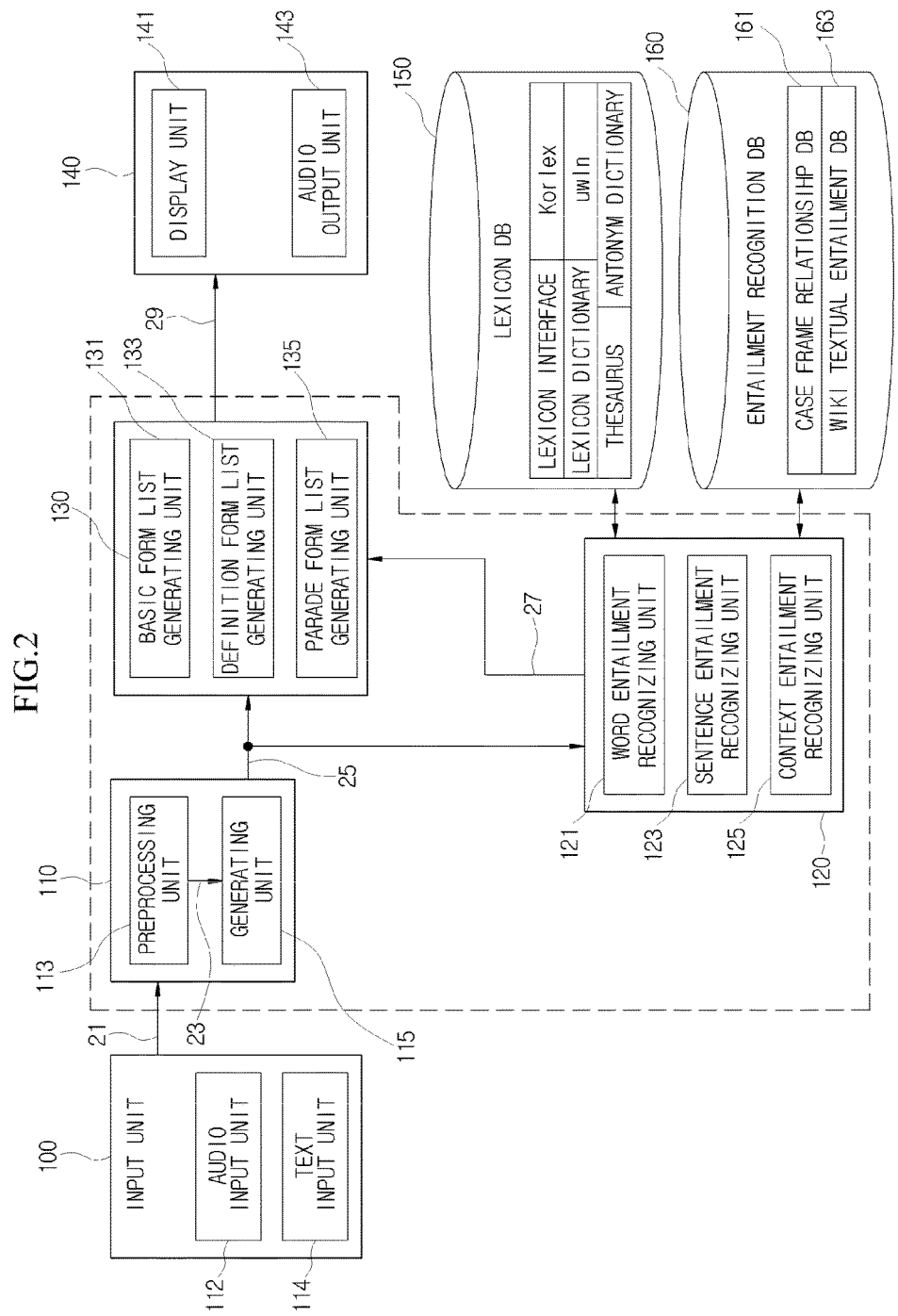
FIG. 2 is a block diagram illustrating a detailed configuration of the question answering system according to an embodiment of the present invention.

Hereinafter, the question answering system according to an embodiment of the present invention will be described in detail with reference to FIG. 2. FIG. 2 is a block diagram illustrating a detailed configuration of the question answering system according to an embodiment of the present invention.

Referring to FIG. 2, the question answering system for generating a candidate answer list includes an input unit 100, the candidate answer generating unit 110, the text entailment recognizing unit 120, the list generating unit 130, the output unit 140, a lexicon database (DB) 150, and an entailment recognition DB 160.

Here, the input unit 100 and the output unit 140 may be implemented in the user interface such as a portable device. The candidate answer generating unit 110, the text entailment recognizing unit 120, the list generating unit 130 may be implemented in a separate server.

The input unit 100 includes an audio input unit 112 and a text input unit 114. The audio input unit 112 receives an audio type natural language question from the user. The text input unit 114 receives a text type natural language question from the user through a display interface. The audio type or text type natural language question 21 is delivered to the candidate answer generating unit 110.

The candidate answer generating unit 110 extracts a document mapped to the input natural language question, and generates at least one candidate answer with respect to the natural language question in the extracted document. To this end, the candidate answer generating unit 110 includes a preprocessing unit 113 and a generating unit 115.

The preprocessing unit 113 performs text entailment recognition by using the natural language question 21 delivered from the input unit 100, thus extending a meaning of the natural language question. For example, the preprocessing unit 113 extends a meaning of the natural language question by using case frames of the natural language question and correlation between case frames. Here, the preprocessing unit 113 extends a basic case frame to a case frame in a passive and causative relationship. If a natural language question in which a basic case frame is "I like you" (A, B, like) is received, the natural language question may extend to a case frame of "You are liked by me" (C, D, liked) in a passive relationship by the preprocessing unit 113.

In addition, the preprocessing unit 113 may extend a meaning of a natural language question by using a synonym. Also, the preprocessing unit 113 may extend a meaning of a natural language question through a generalization operation. Here, the generalization operation includes a unit standardization operation. For example, the preprocessing unit 113 may standardize various expressions of date such as 2014.02.17, Feb. 17, 2014, 14.02.17, 2014-2-17, and the like, to a unit in the form of year-month-date, thereby extending a meaning of a natural language question.

Thereafter, the preprocessing unit 113 delivers the extended natural language question information 23 to the generating unit 115.

The generating unit 115 extracts a document mapped to the extended natural language question information 23 delivered from the preprocessing unit 113. Here, the generating unit 115 generates at least one candidate answer with respect to the natural language question from the extracted document. Thereafter, the generating unit 115 delivers candidate answer information 25 with respect to the generated candidate answer to the list generating unit 130. In addition, the generating unit 115 delivers the candidate answer information 25 to the text entailment recognizing unit 120.

The text entailment recognizing unit 120 performs text entailment recognition indicating a degree of association between each of multiple evidence sentences included in the candidate answer information 25 and the natural language question. To this end, the text entailment recognizing unit 120 includes a word entailment recognizing unit 121, a sentence entailment recognizing unit 123, and a context entailment recognizing unit 125.

The word entailment recognizing unit 121 performs entailment recognition in units of words between the evidence sentences and the natural language question. Here, the word entailment recognizing unit 121 performs word entailment recognition by using data stored in the lexicon database (DB) 150 and an entailment recognition DB 160.

Here, the lexicon DB 150 stores data such as a lexicon interface, a lexicon dictionary, a thesaurus, a Korean language lexical network (Korlex), an antonym dictionary, a verb dictionary, a Korean language semantic system (UOU-Word Intelligent Network (U-WIN)), and the like. Also, the entailment recognition DB 160 stores a case frame relationship DB 161 and a Wiki textual entailment DB 163. Although not shown, the entailment recognition DB 160 may further include a web text DB, a DOM DB, a table type DB, a list type DB, and the like.

The word entailment recognizing unit 121 extracts distance data between lexical networks of lexicons, word similarity data, and the like, included in the natural language question and the evidence sentences from the lexicon DB 150 and the entailment recognition DB 160. Here, word similarity may be extracted from data such as a thesaurus, a lexicon dictionary, and the like, stored in the lexicon DB 150.

Thereafter, the word entailment recognizing unit 121 obtains correction and association between words included the evidence sentences and words included in the natural language question on the basis of data extracted from the lexicon DB 150 and the entailment recognition DB 160. For example, the word entailment recognizing unit 121 may obtain correlation between words by using the obtained word similarity.

The sentence entailment recognizing unit 123 performs entailment recognition in units of sentences between the evidence sentences and the natural language question. For example, the sentence entailment recognizing unit 123 extracts similarity of a syntax structure and pattern similarity through analysis of morphemes of each of the evidence sentences and the natural language question. Thereafter, the sentence entailment recognizing unit 123 performs entailment recognition in units of sentences by using (comparing) the extracted similarity of syntax structure and pattern similarity between the evidence sentences and the natural language question. Here, the syntax structure included in the evidence sentences and the natural language question may be recognized through a dependency-based parsing technique or a context-free parsing technique.

The context entailment recognizing unit 125 performs entailment recognition in units of context between the evidence sentences and the natural language question. For example, the context entailment recognizing unit 125 performs text entailment recognition by using a relationship between an existing case frame and a case frame extended on the basis of the existing case frame.

The text entailment recognizing unit 120 delivers result information 27 of text entailment recognition between the multiple evidence sentences and the natural language question to the list generating unit 130. Here, the text entailment recognition result information 27 includes at least one among a word entailment recognition result, a sentence entailment recognition result, and a context entailment recognition result.

The list generating unit 130 generates candidate answer lists including the multiple evidence sentences in high association degree order by using the candidate answer information 25 delivered from the candidate answer generating unit 110 and the entailment recognition result information 27 delivered from the text entailment recognizing unit 120. Here, the candidate answer information 25 includes evidence sentence information including a candidate answer. To this end, the list generating unit 130 includes a basic form list generating unit 131, a definition form list generating unit 133, and a parade form list generating unit 135.

The basic form list generating unit 131 generates a word type basic form candidate answer list by combining the candidate answers and the evidence sentences on the basis of degree of association between words as an entailment recognition result. Here, the basic form candidate answer list is a word type candidate answer list in which a single word is an answer in response to a simple question.

The definition form list generating unit 133 generates a definition form candidate answer list in which at least one sentence is an answer, by combining candidate answers and evidence sentences on the basis of at least any one among the similarity of syntax structure, pattern similarity, and case frames as the entailment recognition result. Here, the definition form candidate answer list is a sentence type candidate answer list.

In the case of generating a text list type definition form candidate answer list, the definition form list generating unit 133 statistically extracts common order of the text list through recognition of entailment of the text list. Thereafter, the definition form list generating unit 133 displays the statistically extracted text list. For example, it is assumed that there are List A, List B, and List C in response to a natural language question such as "How to make Kimchi Jjigae?.

List A.

1. In a shallow pot, put some chopped kimchi and juice.

2. Add sliced onion, hot pepper paste, hot pepper flakes, sugar, and green onions, and pork belly (or tuna).

3. Pour water over top until all the ingredients are submerged.

4. Close the lid of the pot and boil it 25 or 30 minutes (first 10 minutes will be high heat and then turn down the heat over medium heat)

5. Add some tofu and boil it 5 minutes more and put some sesame oil right before serving.

List B.

1. Cook bacon (and/or oil drained from a tuna can) in a saucepan.
2. When the bacon is completely cooked, add kimchi, green onion, and a spoon of red pepper powder and stir-fry for about 3 minutes.
3. Add a cup of water, ⅓ cup of kimchi liquid, ½ spoon of crushed garlic, and jalapeño. Add the rest of the tuna in this step if you poured the oil in tuna can in Step 1.
4. Add tofu and stir until completely cooked.

List C.

1. Chop vegetables and pork belly
2. Start by adding the sesame oil and minced garlic
3. Add pork belly and keep cooking until the pink color is gone
4. If you like a thick and sweet stew, add onions and/or gochujang (both optional)
5. Add Kimchi and cook for about 10 mins. Add water and on low heat, cook for approximately 20+ mins. Longer the better
6. Add tofu and green onions last and cook for 5 more minutes. Add sugar as needed for sweeter flavor.

Referring to the lists (List A, List B, and List C) regarding a method for making Kimchi Jjigae, it can be seen that No. 3 sentence of List C and No. 1 sentence of List B have the same meaning in entailment. Also, No. 4 sentence of List A, No. 3 sentence of List B, and No. 5 sentence of List C are written in different manners but commonly have the meaning of boiling Kimchi. Similarly, all of No. 5 sentence of List A, No. 4 sentence of List B, and No. 6 of List C have a meaning that tofu is added and boiled for five minutes.

The definition form list generating unit 133 statistically combines the text lists (List A, List B, and List C) through text entailment recognition. Common orders respectively included in the lists are statistically extracted according to the combining result from the definition form list generating unit 133, and the statistically extracted common orders are combined into the form of a candidate answer list.

The parade form list generating unit 135 extracts answers from several documents with respect to the natural language question. Thereafter, the parade form list generating unit 135 generates a candidate answer list in consideration of the order of extracted answers and combination of answers.

For example, the parade form list generating unit 135 generates a parade form candidate answer list of "Seoul Sungnyemun, Ten-story Stone Pagoda of Wongaksa Temple Site, Silla King Chinhung Sunsubi Monument" as an answer to the question of "What are formal titles of national treasures No. 1 No. 2, and No. 3?". In addition, the parade form list generating unit 135 generates a candidate answer list in consideration of the number of answers with respect to a question including a number. For example, with respect to a question of "Who are the three major artists?", the parade form list generating unit 135 generates a candidate answer list including three artists as an answer.

The list generating unit 130 delivers basic form, definition form, and parade form candidate answer list information 29 to the output unit 140.

The output unit 140 outputs the candidate answer list delivered from the list generating unit 130 and an evidence sentence corresponding to a candidate answer selected by the user from the candidate answer list. To this end, the output unit 140 includes a display unit 141 and an audio output unit 143.

The display unit 141 displays the candidate answer list and the evidence sentence corresponding to the candidate answer selected by the user. Here, the number of the candidate answer list is determined depending on the size of a display screen. For example, the display unit may include at least one among a liquid crystal display (LCD), a thin film transistor-liquid crystal display (TFT-LCD), an organic light-emitting diode (OLED), a flexible display, and a 3D display.

The audio output unit 143 outputs the candidate answer list and the evidence sentence corresponding to the candidate answer selected by the user, by voice.

The output unit 140 provides the evidence sentence corresponding to the candidate answer visually or acoustically to the user through at least one of the display unit 141 and the audio output unit 143.

Figure 3:
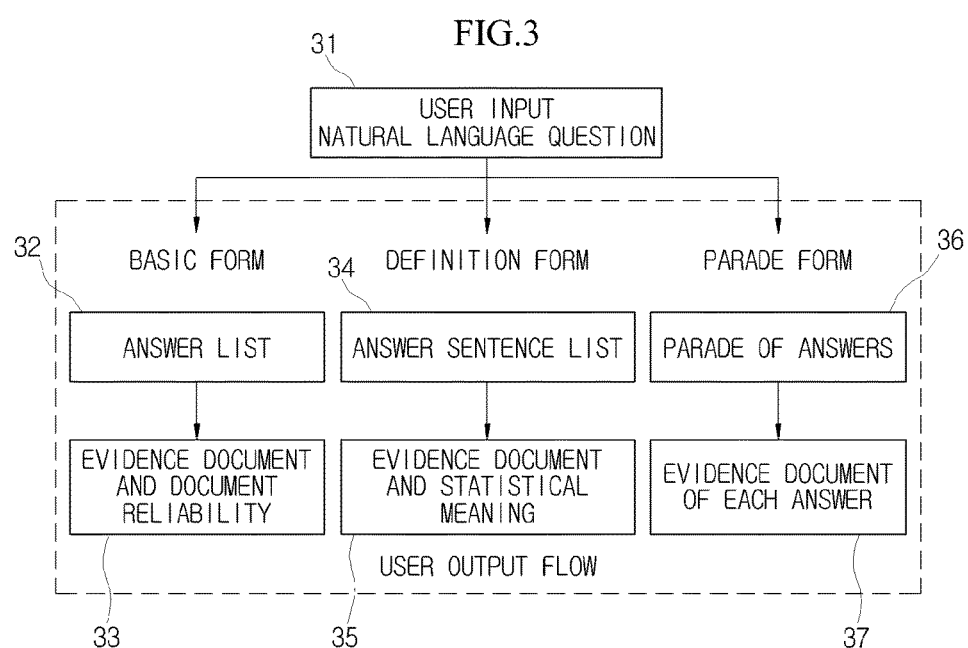
FIG. 3 is a view illustrating an output flow of the question answering system according to an embodiment of the present invention.

FIG. 3 is a view illustrating an output flow of the question answering system according to an embodiment of the present invention. Referring to FIG. 3, the output unit 140 outputs a basic form candidate answer list 32, a definition form candidate answer list 34, and a parade form candidate answer list 36 in response to a natural language question 31. Here, the basic form candidate answer list 32, the definition form candidate answer list 34, and the parade form candidate answer list 36 may be lists which have been generated by the basic form list generating unit 131, the definition form list generating unit 133, and the parade type list generating unit 135, respectively.

The basic form candidate answer list 32 is a candidate answer list in which a word is an answer. For example, when the user selects one candidate answer from the basic form candidate answer list 32 including words, the output unit 140 outputs first evidence document information 33 including the selected candidate answer. Here, the output first evidence document information 33 includes an evidence sentence, an evidence document, document reliability, and the like.

The definition type candidate answer list 34 is a candidate answer list in which sentences or orders of sentences are an answer. For example, when the user selects one candidate answer from an answer sentence list, the output unit 140 outputs second evidence document information 35 including the selected candidate answer. Here, the second evidence document information 35 may include text of a document, an entailment recognized portion between text of the document and the question, an information source, summary of documents, statistical meaning of document, and the like.

The parade form candidate answer list 36 is a candidate answer list generated by extracting answers from several documents and considering orders of answers and a combination of answers. For example, when the user selects one of candidate answer lists, the output unit 140 outputs third evidence document information 37 including the selected candidate answer.

The question answering system according to an embodiment of the present invention combines candidate answers and evidence sentences with respect to a natural language question through text entailment recognition and provides a candidate answer list with respect to the natural language question to the user.

Figure 4:
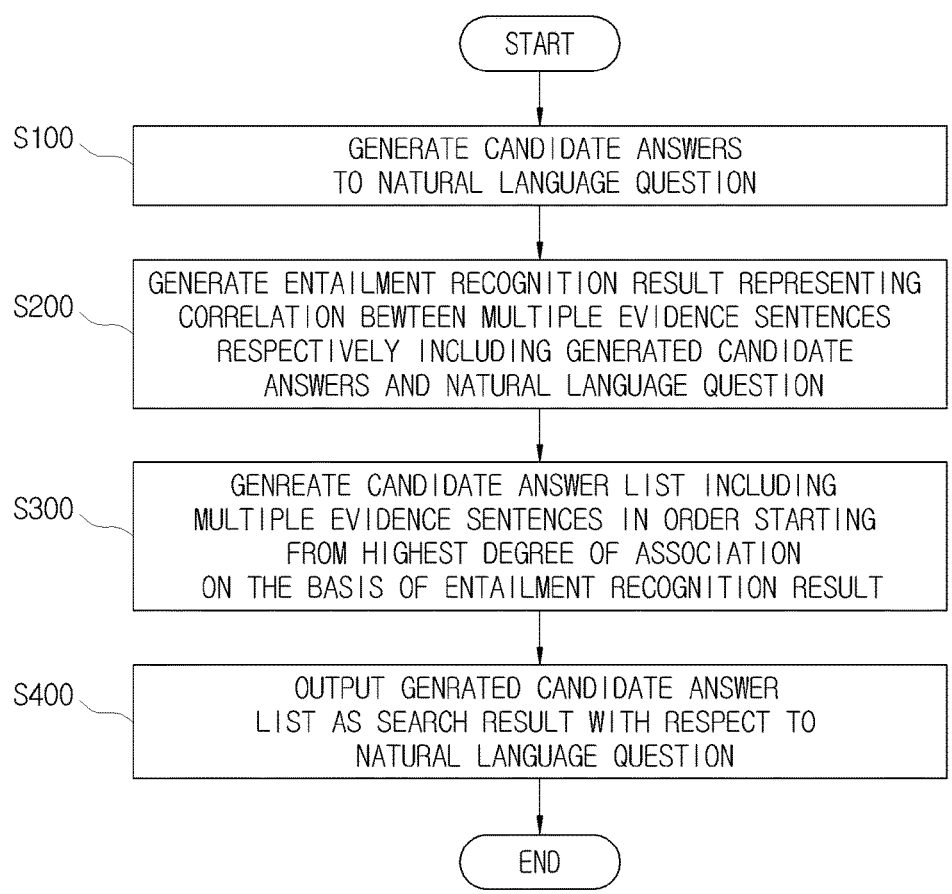
FIG. 4 is a flow chart illustrating a question answering method according to an embodiment of the present invention.

FIG. 4 is a flow chart illustrating a question answering method of the question answering system according to an embodiment of the present invention.

In step S100, the candidate answer generating unit 110 of the question answering system generates candidate answers with respect to a natural language question. For example, the candidate answer generating unit 110 extracts a document mapped to the input natural language question and generates candidate answers with respect to the natural language question in the extracted document.

In step S200, the text entailment recognizing unit 120 of the question answering system generates an entailment recognition result. The text entailment recognizing unit 120 generates an entailment recognition result representing correlation between multiple evidence sentences respectively including the generated candidate answers and the natural language question.

In step S300, the list generating unit 130 of the question answering system generates a candidate answer list on the basis of the entailment recognition result in step S200. For example, the list generating unit 130 generates a candidate answer list including multiple evidence documents in high association degree order In operation S400, the output unit 140 of the question answering system outputs the candidate answer list generated in step S300, as a search result with respect to the natural language question.

Figure 5:
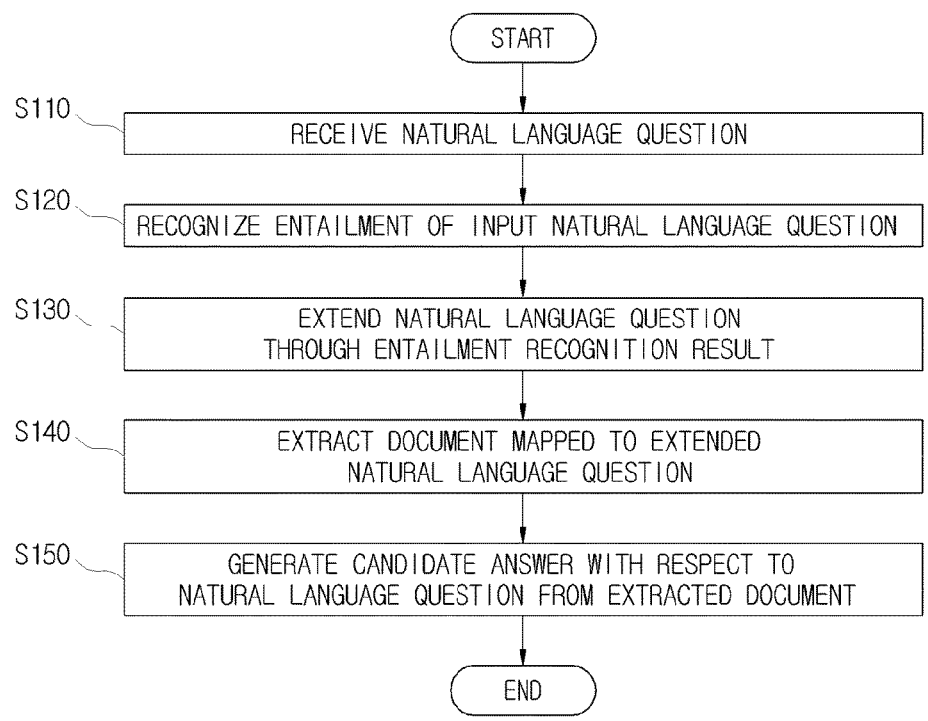
FIG. 5 is a detailed flow chart illustrating a step of generating candidate answers to a natural language question according to an embodiment of the present invention.

Hereinafter, the process (step S100) of generating candidate answers by the candidate answer generating unit 110 with respect to the natural language question according to an embodiment of the present invention will be described in more detail with reference to FIG. 5.

In step S110, the candidate answer generating unit 110 receives a natural language question from the user. In step S120, the candidate answer generating unit 110 performs entailment recognition of the natural language question input in step S110. In step S130, the candidate answer generating unit 110 extends a meaning of the natural language question through the entailment recognition result. In step S140, the candidate answer generating unit 110 extracts a document mapped to the extended natural language question. In step S150, the candidate answer generating unit 110 generates candidate answers with respect to the natural language question in the extracted document.

Figure 6:
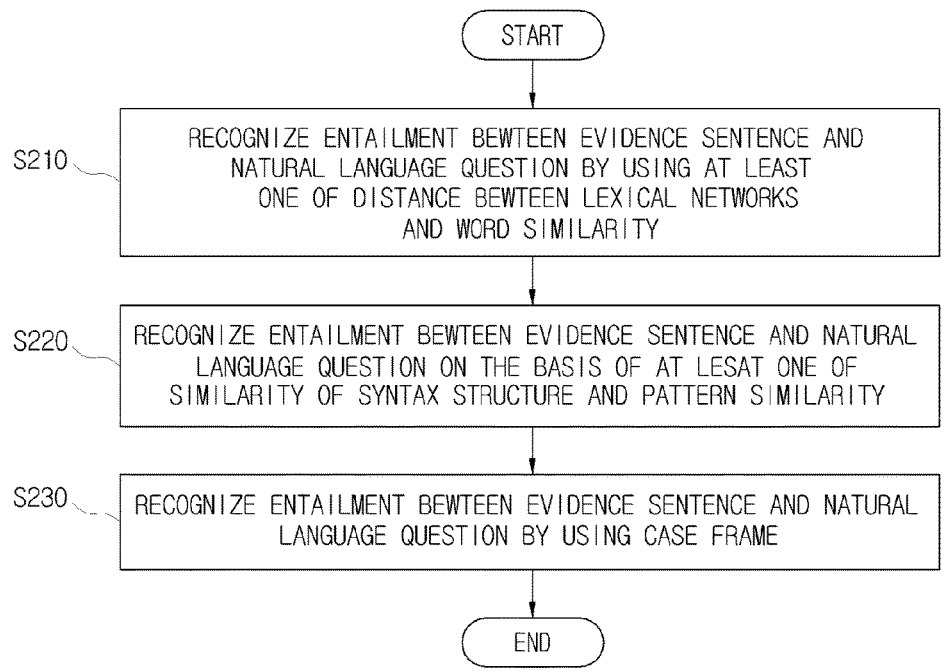
FIG. 6 is a detailed flow chart illustrating a step of generating an entailment recognition result according to an embodiment of the present invention.

Hereinafter, the process (step S200) of generating an entailment recognition result by the text entailment recognizing unit 120 according to an embodiment of the present invention will be described in more detail with reference to FIG. 6.

In step S210, the text entailment recognizing unit 120 performs a process of recognizing text entailment between the evidence sentences and the natural language question. For example, the text entailment recognizing unit 120 extracts distance data between lexical networks of lexicons, word similarity data, and the like, included in the natural language question and the evidence sentences from the lexicon DB 150 and the entailment recognition DB 160. Thereafter, the text entailment recognizing unit 120 obtains data such as correlation, a degree of association, and the like, between words by using the extracted data.

In step S220, the text entailment recognizing unit 120 performs entailment recognition in units of sentences between the evidence sentences and the natural language question. Here, the text entailment recognizing unit 120 recognizes entailment between the evidence sentences and the natural language question on the basis of at least one of similarity of a syntax structure and pattern similarity.

In step S230, the text entailment recognizing unit 120 performs entailment recognition in units of context between the evidence sentences and the natural language question. Here, the text entailment recognizing unit 120 recognizes entailment between the evidence sentences and the natural language question by using case frames.

Figure 7:
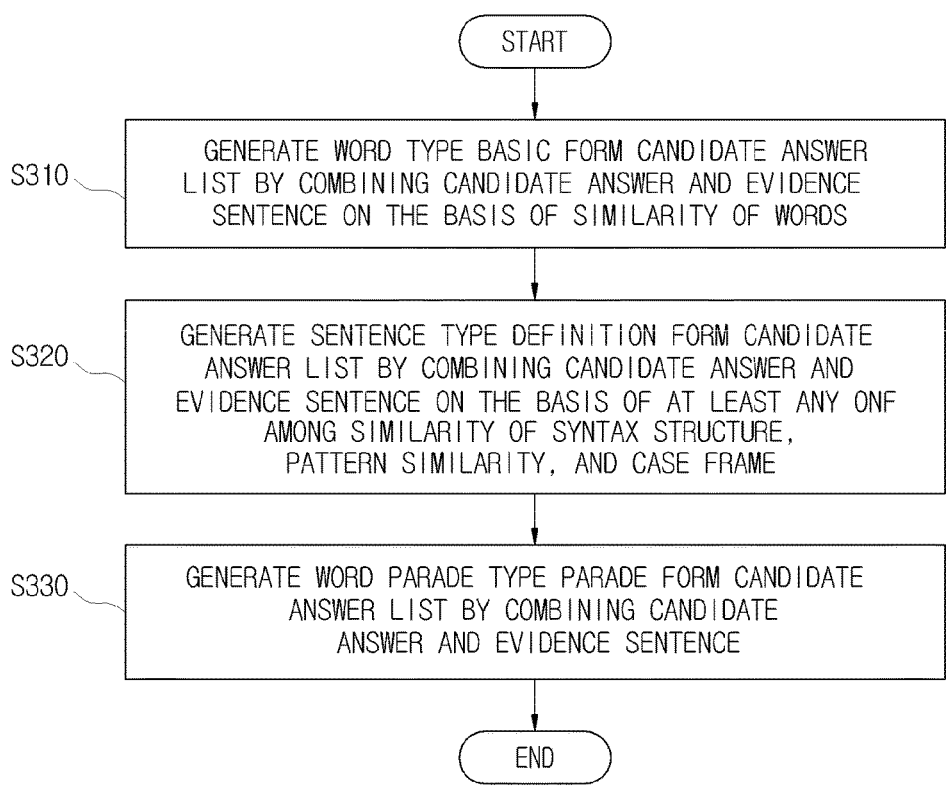
FIG. 7 is a detailed flow chart illustrating a step of generating a candidate answer list according to an embodiment of the present invention.

Hereinafter, the process (step S300) of generating a candidate answer list by the list generating unit 130 according to an embodiment of the present invention will be described in more detail with reference to FIG. 7.

In step S310, the list generating unit 130 generates by a basic form candidate answer list in which a word is an answer, by combining the candidate answers and the evidence sentences. For example, the list generating unit 130 combines candidate answer lists and the evidence sentences on the basis of similarity of words. Here, combining may refer to a process of making a list by adding an evidence sentence and a candidate answer. The list generating unit 130 generates a candidate answer list by listing candidate answers in which similarity between words is equal to or greater than a preset numerical value, obtained through entailment recognition result.

In step S320, the list generating unit 130 generates a definition form candidate answer list. For example, the list generating unit 130 combines candidate answers and evidence sentences on the basis of at least any one among the similarity of syntax structure, pattern similarity, and case frames. Here, combining may refer to a process of making a list by adding an evidence sentence and a candidate answer. Thereafter, the list generating unit 130 generates a definition form candidate answer list in which a sentence is an answer.

In step S330, the list generating unit 130 generates a parade form candidate answer list. The list generating unit 130 generates a parade form candidate answer list in which a parade of words is an answer by combining candidate answers and evidence sentences. Here, combining may refer to a process of making a list by adding an evidence sentence and a candidate answer. For example, the list generating unit 130 extracts answers from several documents with respect to the natural language question and generates a candidate answer list in consideration of order of answers and combination of answers.

Figure 8A:
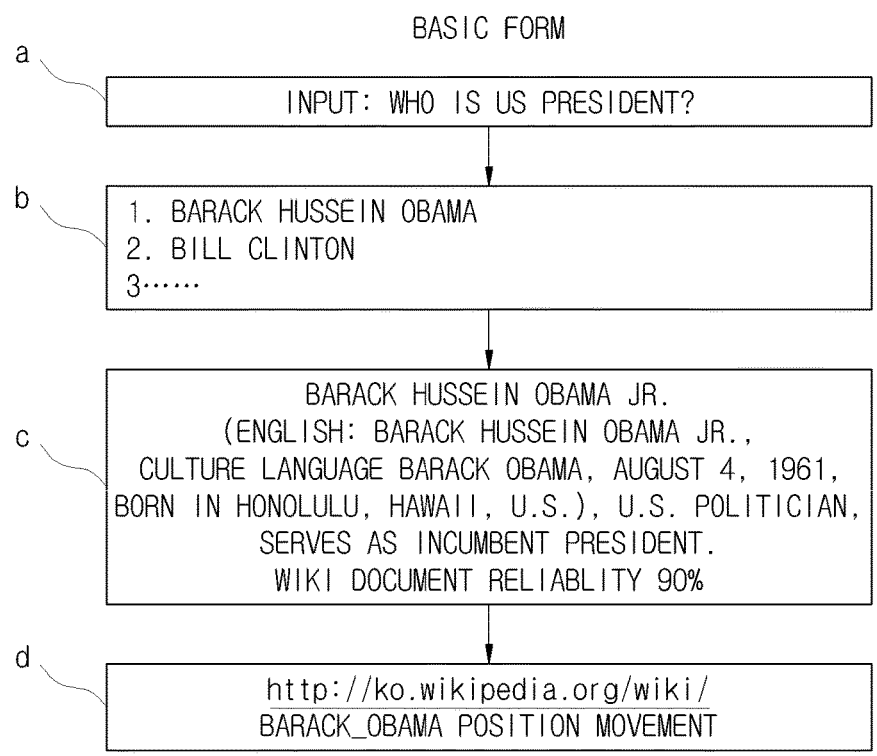
FIG. 8A, 8B, 8C are a view illustrating an output example of a candidate answer list according to an embodiment of the present invention.
Figure 8B:
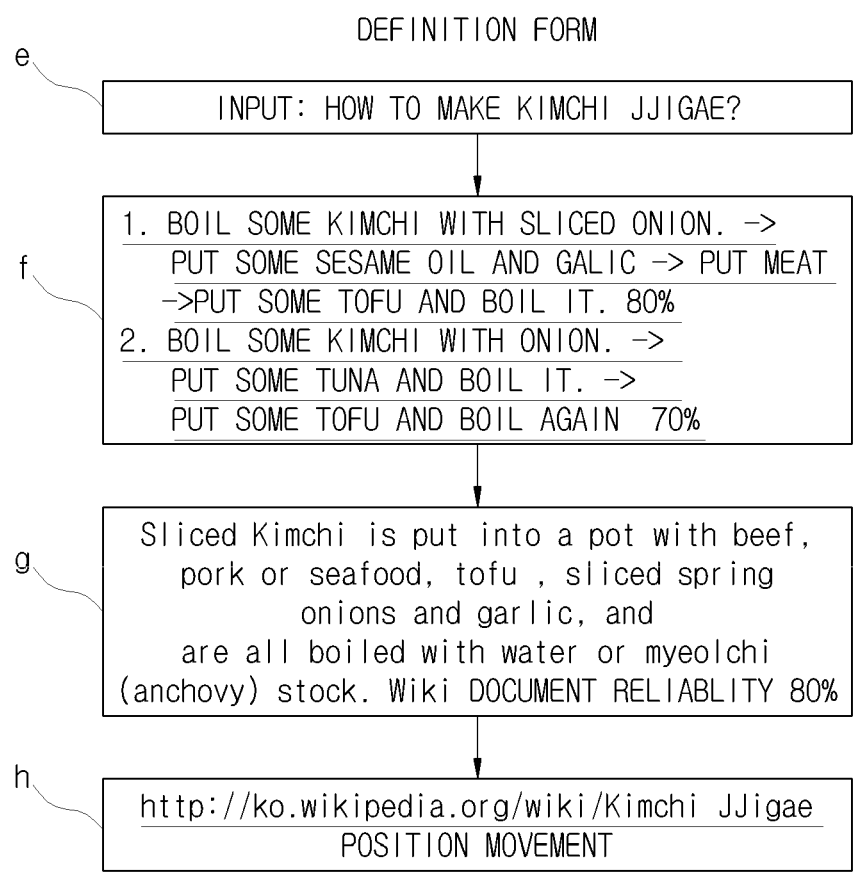
Figure 8C:
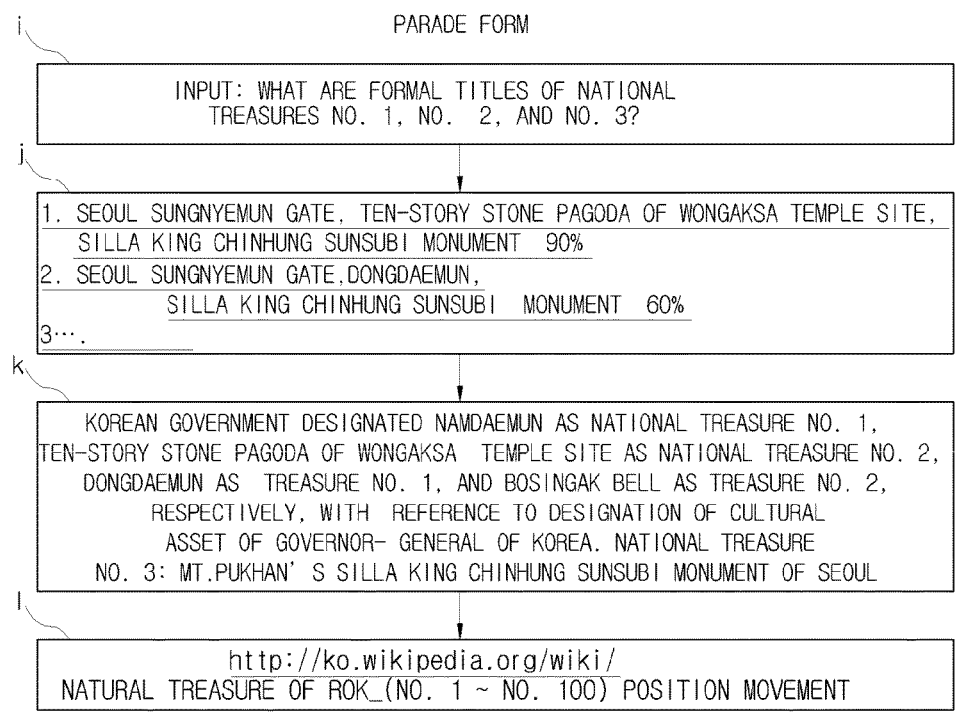

Hereinafter, a candidate answer list output through the output unit 140 in step S400 according to an embodiment of the present invention will be described as an example with reference to FIG. 8A, FIG. 8B, and FIG. 8C.

In the basic form, when a question (a) of "Who is U.S. president?" is input, a candidate answer list (b) generated according to an entailment recognition result is output through the output unit 140. For example, the candidate answer list (b) with respect to the question is 1. Barack Hussein Obama 90%, 2. Bill Clinton 40%, and the like.

Here, the user may be provided the at least one candidate answer list (b) and information (c) regarding the candidate answer together with respect to the question (a). Here, the information regarding the candidate answer includes reliability, the number of documents, a summary of a document, a portion of a document, and the like.

Alternatively, the user may obtain list information of an answer, rather than a list of documents, or information of a single answer having the highest reliability, as an output. In addition, the user may be provided with a source (d) of an evidence sentence.

In the definition form, when a question (e) of "How to make Kimchi Jjigae?" is input, a list (f) of a method for making Kimchi Jjigae is extracted as a response to the question by the question answering system according to an embodiment of the present invention. In an embodiment, text lists are combined through text entailment recognition and a common order is statistically extracted.

Thereafter, the output unit 140 makes the extracted common order as a list and provides the same. Here, when the user selects one of the candidate answer list, an evidence sentence (g) corresponding to the candidate answer is output through the output unit 140. In addition, a source (h) of the evidence sentence may also be output through the output unit 140.

In the parade form, when a question (i) of "What are formal titles of national treasures No. 1 No. 2, and No. 3?", the parade form list generating unit 135 extracts answers from several documents. Thereafter, the parade form list generating unit 135 generates a candidate answer list (j) in consideration of order of answers and a combination of answers. For example, in the parade form, a parade of "Seoul Sungnyemun, Ten-story Stone Pagoda of Wongaksa Temple Site, Silla King Chinhung Sunsubi Monument" is provided as an answer to the question (i) of "What are formal titles of national treasures No. 1 No. 2, and No. 3?".

Also, in the candidate answer list illustrated in the parade form, when one of the candidate answer list is selected, an evidence sentence (k) corresponding to the selected candidate answer is output. In addition, a source (l) of the evidence sentence may be output.

Figure 9:
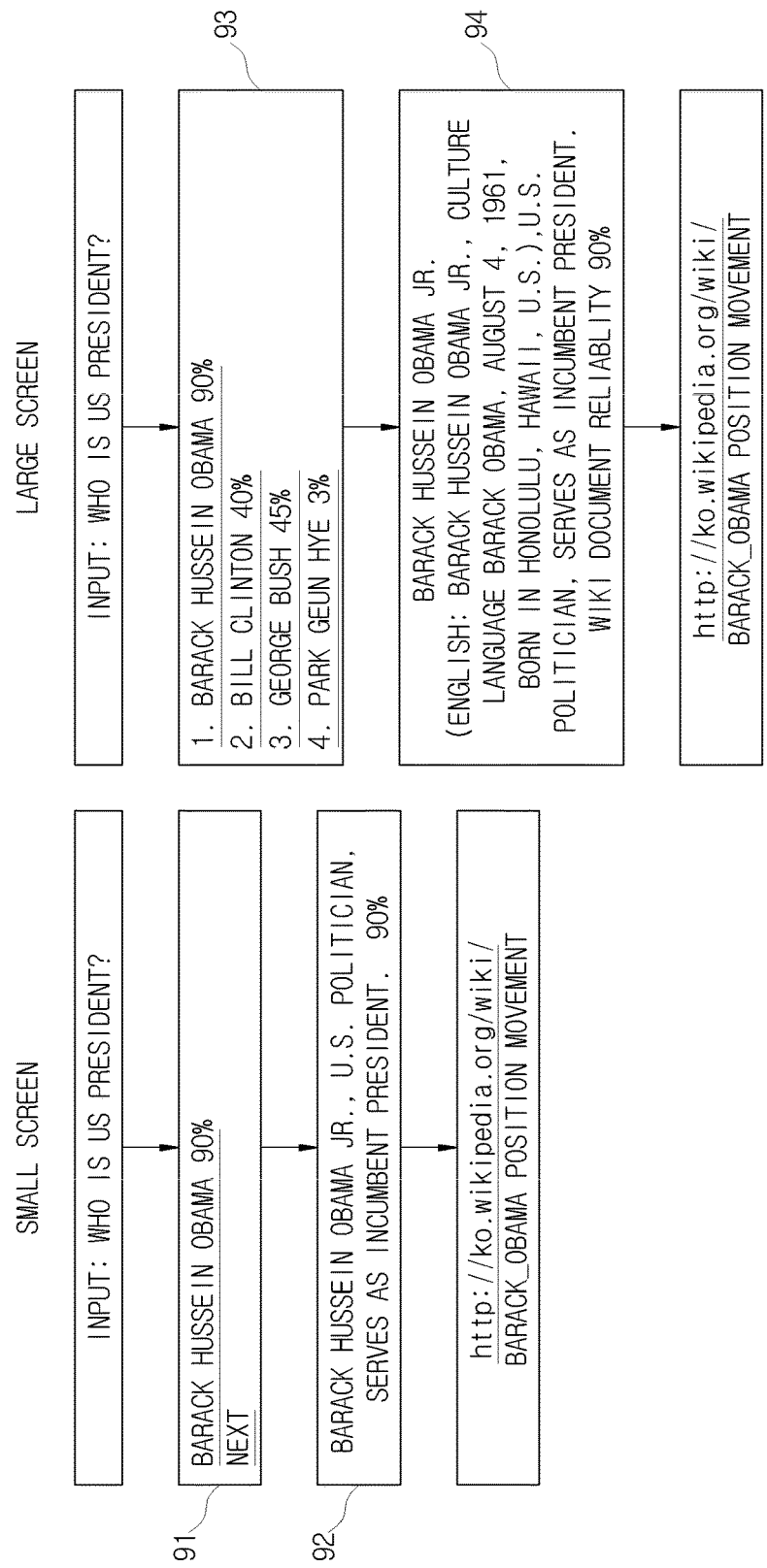
FIG. 9 is a view illustrating a difference in outputs according to sizes of a display screen according to an embodiment of the present invention.

FIG. 9 is a view illustrating a difference in outputs according to sizes of a display screen according to an embodiment of the present invention.

Referring to FIG. 9, the number of output candidate answer list is adjusted according to a size of a display screen. For example, when a display screen is small, a portion 91 of the candidate answer is output on the screen. In addition, a portion 92 of an evidence sentence corresponding to the candidate answer is output according to the size of the display screen.

When the display screen is larger than that of illustrated example, a large number of candidate answer lists 93 is output. Similarly, a larger portion of an evidence sentence 94 corresponding to the candidate answer is output according to the size of the display screen.

As described above, in the present invention, a candidate answer with respect to a natural language question and evidence sentences including the candidate answer are combined through text entailment recognition and a candidate answer list with respect to the natural language question is provided to the user. Thus, the user selects an answer with respect to the question from the searched candidate answer list, rather than searching an answer with respect to the question from searched documents. Thus, the user may be provided with an answer with respect to a question conveniently.

According to the present invention, a candidate answer list is provided to the user in response to a question. The user can select an answer with respect to a question from a candidate answer list in a form in which a candidate answer and evidence sentences are combined, rather than searching an answer with respect to the question from documents, thereby conveniently obtaining a desired search answer. In addition, searching may be performed on the basis of natural language through text entailment recognition.

Figure 10:
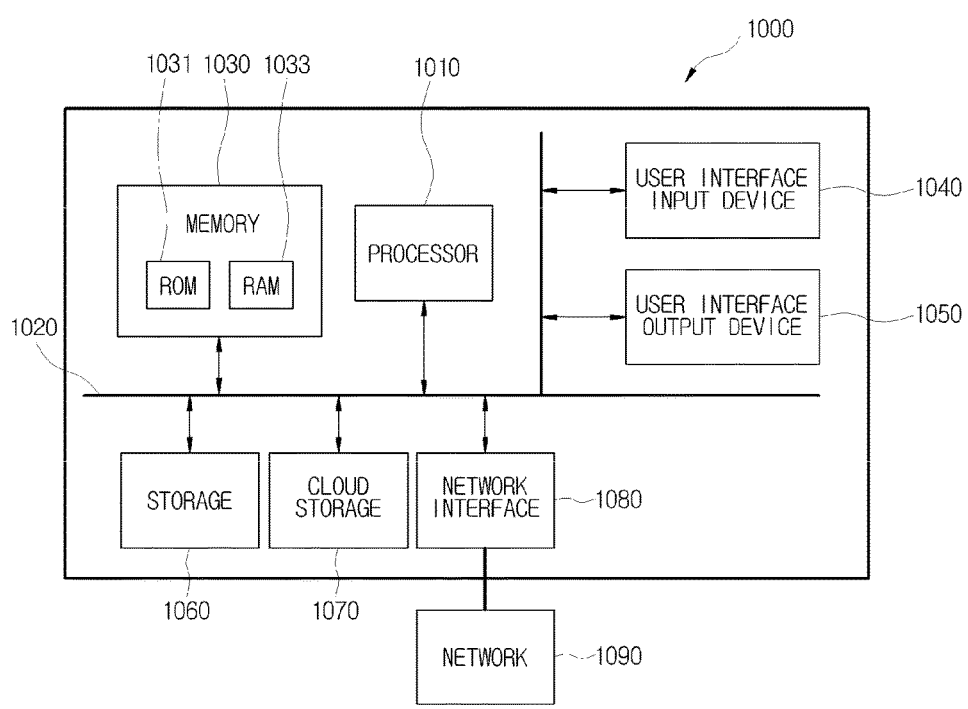
FIG. 10 is a block diagram illustrating a computer system for the present invention.

An embodiment of the present invention may be implemented in a computer system, e.g., as a computer readable medium. As shown in FIG. 10, a computer system 1000 may include one or more of a processor 1010, a memory 1030, a user input device 1040, a user output device 1050, a storage 1060 and a cloud storage 1070, each of which communicates through a bus 1020. The computer system 1000 may also include a network interface 1080 that is coupled to a network 1090. The processor 1010 may be a central processing unit (CPU) or a semiconductor device that executes processing instructions stored in the memory 1030 and/or the storage 1060. The memory 1030 and the storage 1060 may include various forms of volatile or non-volatile storage media. For example, the memory 1030 may include a read-only memory (ROM) 1031 and a random access memory (RAM) 1033.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A question answering system comprising:
an input unit configured to receive a natural language question in at least one of a sound form and a text form;
a candidate answer generating unit configured to extract a document mapped to the input natural language question, and generate candidate answers with respect to the natural language question from the extracted document;
a text entailment recognizing unit configured to generate a text entailment recognition result representing a degree of association between multiple evidence sentences including the generated candidate answers and the natural language question;
a list generating unit configured to generate a candidate answer list including the multiple evidence sentences in high association degree order according to the text entailment recognition result; and
an output unit configured to output the generated candidate answer list as a search result with respect to the natural language question,
wherein the text entailment recognizing unit includes
a word entailment recognizing unit configured to recognize word entailment between the multiple evidence sentences and the natural language question by using at least one of a distance between lexical networks and word similarity, stored previously;
a sentence entailment recognizing unit configured to recognize sentence entailment between the multiple evidence sentences and the natural language question on the basis of similarity of a syntax structure and pattern similarity; and
a context entailment recognizing unit configured to recognize context entailment between the multiple evidence sentences and the natural language question by using a case frame, and
wherein the list generating unit comprises:
a basic form list generating unit configured to generate a word type basic form candidate answer list by combining the candidate answers and the multiple evidence sentences on the basis of similarity of words;
a definition form list generating unit configured to generate a sentence type definition form candidate answer list by combining the candidate answers and the multiple evidence sentences on the basis of at least any one of the similarity of a syntax structure, the pattern similarity, and the case frame; and
a parade form list generating unit configured to generate a word parade type parade form candidate answer list by combining the candidate answers and the multiple evidence sentences.

2. The question answering system of claim 1, wherein the definition form list generating unit statistically and semantically extracts common order of the text lists through entailment recognition of text lists and combines the extracted text lists.

3. The question answering system of claim 1, wherein the output unit outputs an evidence sentence corresponding to a candidate answer selected by a user from the candidate answer list.

4. The question answering system of claim 1, wherein the number of candidate answer list is determined according to a size of a display screen.

5. A question answering method comprising:
generating candidate answers with respect to a natural language question;
generating a text entailment recognition result representing a degree of association between multiple evidence sentences including the generated candidate answers and the natural language question;
generating a candidate answer list including the multiple evidence sentences in high association degree order according to the text entailment recognition result; and
outputting the generated candidate answer list as a search result with respect to the natural language question,
wherein the generating of an entailment recognition result includes
recognizing word entailment between the multiple evidence sentences and the natural language question by using at least one of a distance between lexical networks and word similarity;
recognizing sentence entailment between the multiple evidence sentences and the natural language question on the basis of at least one of similarity of a syntax structure and pattern similarity; and
recognizing context entailment between the multiple evidence sentences and the natural language question on the basis of a case frame, and wherein the generating of a candidate answer list includes
generating a word type basic form candidate answer list by combining the candidate answers and the multiple evidence sentences on the basis of similarity of words;
generating a sentence type definition form candidate answer list by combining the candidate answers and the multiple evidence sentences on the basis of at least any one of the similarity of a syntax structure, the pattern similarity, and the case frame; and
generating a word parade type parade form candidate answer list by combining the candidate answers and the multiple evidence sentences.

6. The question answering method of claim 5, wherein the generating of candidate answers with respect to the natural language question comprises:
receiving the natural language question;
performing entailment recognition on the input natural language question;
extending a meaning of the natural language question through the entailment recognition result;
extracting a document mapped to the extended natural language question; and
generating candidate answers with respect to the natural language question from the extracted document.

7. The question answering method of claim 5, wherein the generating of a definition form candidate answer list comprises, when a definition form candidate answer list in which the generated candidate answers are in a text list form is generated, statistically extracting common order of the text lists through entailment recognition of the text lists and displaying the extracted text list.

8. The question answering method of claim 5, wherein the outputting of a generated candidate answer list as a search result with respect to the natural language question comprises, when a certain answer is selected from the candidate answer list, outputting an evidence sentence corresponding to the selected certain answer.

9. The question answering method of claim 6, wherein the outputting of a generated candidate answer list as a search result with respect to the natural language question comprises adjusting the number of candidate answer list according to a size of a display screen.

* * * * *